US010460585B2

(12) United States Patent
Chabra et al.

(10) Patent No.: US 10,460,585 B2
(45) Date of Patent: Oct. 29, 2019

(54) RFID DIRECTED VIDEO SNAPSHOTS CAPTURING TARGETS OF INTEREST

(71) Applicant: SYMBOL TECHNOLOGIES, LLC, Lincolnshire, IL (US)

(72) Inventors: Jimmy Chabra, Massapequa, NY (US); Rehan K. Jaffri, New York, NY (US); Charles G. Lauria, Miller Place, NY (US); Thomas E. Wulff, Brookhaven, NY (US); Sean Connolly, Stony Brook, NY (US); Russell Calvarese, Stony Brook, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 200 days.

(21) Appl. No.: 15/613,884

(22) Filed: Jun. 5, 2017

(65) Prior Publication Data
US 2018/0350221 A1    Dec. 6, 2018

(51) Int. Cl.
G08B 21/04    (2006.01)
G06K 9/32    (2006.01)
G06F 16/38    (2019.01)
G06K 9/00    (2006.01)

(52) U.S. Cl.
CPC ....... G08B 21/0492 (2013.01); G06F 16/381 (2019.01); G06K 9/00771 (2013.01); G06K 9/3208 (2013.01)

(58) Field of Classification Search
CPC .............. G08B 21/0492; G06F 16/381; G06K 9/00771; G06K 9/3208

USPC ......................................................... 382/296
See application file for complete search history.

(56) References Cited

U.S. PATENT DOCUMENTS

| 6,483,427 | B1 * | 11/2002 | Werb | ...................... | G01S 13/84 340/10.1 |
|---|---|---|---|---|---|
| 2004/0105006 | A1 | 6/2004 | Lazo et al. | | |
| 2004/0164858 | A1 | 8/2004 | Lin et al. | | |
| 2010/0097221 | A1 | 4/2010 | Kreiner et al. | | |

(Continued)

OTHER PUBLICATIONS

Goller, Michael, Christoph Feichtenhofer, and Axel Pinz. "Fusing RFID and computer vision for probabilistic tag localization." 2014 IEEE International Conference on RFID (IEEE RFID). IEEE, 2014. (Year: 2014).*

(Continued)

*Primary Examiner* — Jonathan S Lee
(74) *Attorney, Agent, or Firm* — Yuri Astvatsaturov (57) ABSTRACT

A method and apparatus for locating a moving target in a venue and for capturing a sequenced timeline of target directed images is described. Target sensing stations having a wide-angle video camera, such as a 180° video camera, are positioned within the venue. Each sensing station includes a sensing unit, such as radio frequency identification (RFID) transceiver unit, that determines a location and/or direction of travel of the target. The sensing station correlates the RFID transceiver information with the wide-angle video camera to specifically filter and process a video stream from the camera, producing target directed image snapshots from the stream that are assembled at a centralized controller into the sequenced timeline images that may be used in monitoring target movement and to establish location chain for prevention of unauthorized movement.

23 Claims, 9 Drawing Sheets

(56) References Cited

U.S. PATENT DOCUMENTS

2010/0165112 A1     7/2010   Scanlon et al.
2012/0269386 A1    10/2012   Hankins et al.
2016/0381306 A1    12/2016   Yang et al.
2018/0218224 A1*   8/2018   Olmstead ......... G08B 13/19643

OTHER PUBLICATIONS

Álvarez López, Yuri, et al. "RFID Technology for management and tracking: e-health applications." Sensors 18.8 (2018): 2663. (Year: 2018).*

International Search Report and Written Opinion for International Application No. PCT/US2018/035031 dated Sep. 14, 2018.

* cited by examiner

RFID DIRECTED VIDEO SNAPSHOTS CAPTURING TARGETS OF INTEREST

FIELD OF THE INVENTION

The present disclosure relates generally to arrangements for, and methods of, locating and tracking a mobile target in a venue in which target sensing systems are deployed, and, more particularly, to using locating and tracking performance of target sensing systems to generate a sequenced timeline of images of the target of interest in a venue.

BACKGROUND

Systems designed to locate and track a mobile target in a venue are used in retail, factory, and warehouse environments for product tracking, product identification, inventory control, and theft detection/prevention. Radio frequency identification (RFID) technology is commonly used in these systems to facilitate locationing and tracking. RFID transceivers are positioned throughout a venue, such as in overhead locations, and operated to identify RFID tags on targets moving throughout the venue. The RFID transceivers are connected to a network host computer or server. The specific location of any particular RFID-tagged product in the venue is typically determined by having the host computer process the payloads and capture data from a plurality of the readers and using triangulation/trilateration techniques.

In some environments, location and tracking systems use video surveillance by having video cameras positioned throughout the venue to capture video streams of images from within the venue. For example, overhead wide-angle cameras are used to stream wide-angle or ultra-wide angle video of respective portions of the venue. These wide-angle video cameras are desired for their ability to cover large areas, but they are disadvantageous when surveillance personnel wants to concentrate on a particular location or on a particular moving target. Wide-angle video streams, for example, can capture large portions of a venue, requiring fewer wide-angle cameras as a result. But such systems are not capable of sufficiently targeting a particular target area, known as a zone of interest (ZOI), and, as such, such systems are not capable of sufficiently identifying, with video images, items of interest in those ZOI. The limitations of such wide-angle video camera systems are narrowed even further when trying to track multiple targets moving at the same time within a venue. Such systems are not equipped to provide individualized target tracking. Further still, the bandwidth demands of wide-angle cameras can be overwhelming on network communication infrastructure, as the size of the venue scales up. There is a need for an improved locationing system capable of tracking targets moving within a venue.

DETAILED DESCRIPTION OF THE INVENTION

While the following description is presented in the context of an environment including image capture devices (also referred to as image sensors) configured to capture image data representative of the environment, example methods and apparatuses to synchronize data capture disclosed herein are applicable to any data capture system. Further, the image sensors described herein are example data capture devices, and example methods and apparatuses disclosed herein are applicable to any suitable type of data capture device(s).

According to some embodiments of the present invention, an improved technique is described to locate and track a mobile target in a venue. Locationing and tracking systems are configured as devices located in overhead positions in a venue. For example, such systems may be implemented using a plurality of overhead target sensing stations, each station having one or more transceiver-based sensing units that identify mobile targets in the venue. For example, these sensing units may be RFID transceiver units that identify targets by identifying transmitters, such as RFID tags, associated with the targets. Each overhead target sensing station further includes a video system, such a wide-angle video camera, configured to capture a wide-angle video stream of a portion of the venue.

With the present techniques, these two main systems of a sensing station, i.e., the sensing unit and the video system, are configured to coordinate operation, thereby allowing sensing stations to capture tailored video images of one or more zones of interest (ZOI) and/or of one or more targets of interest (TOI), also termed "items of interest" or "IOI"). In other words, the operation of the video system and sensing unit may be synchronized during operation. For example, captured video streams and/or captured video images of the video system can be filtered at the sensing station using locationing data. A sensing unit determines when a triggering event occurs related to a target of interest, such as when a stationary target of interest begins to move within a venue or when a target sensing station fails to locate a previously-detected target in the venue (such as when a target is no longer detected on a previously identified shelf or location). The sensing unit uses the triggering event to begin coordination between it and the video system to capture and store filtered images of the target and/or filtered video streams of the target while within the venue.

The sensing station coordination, explained in example implementations further herein, may include using the location of the target to determine a direction of the target relative to a sensing station. The sensing station takes that direction and uses it, in a coordinated manner, to filter a collected video stream to generate images, from that video stream, that track a TOI as it moves through the venue. These images may then be transmitted to a centralized controller or server that collects images from various different sensing units in a venue and generates a sequenced timeline of images, each showing the tracked TOI as it moves through the venue. The process can continue until a second triggering event occurs, whether that second triggering event is a non-alerting event, such as the TOI being re-positioned onto a shelving within the venue, or whether that second triggering event is an alert generating event, such as the TOI being moved to a restricted area, such as to a point of sale location or the near the exit of the venue.

The captured and assembled sequenced timeline of images can operate as a breadcrumb trail of a target or other TOI as it moves within the venue, maintaining and recording a constant observation of the TOI from the first triggering event to the second triggering event/alarm condition.

The centralized controller may generate real time alerts and then send the sequenced timeline of events to a computerized surveillance/loss prevention system, to a computerized inventory system, to security personnel, to any internal computerized system, to any external computerized system communicatively coupled to the controller through a network, or to other systems. In some example embodiments, when the centralized controller generates an alert, security personnel can quickly and easily view the TOI sequenced timeline to identify movement of the TOI, instead of traversing through video footage.

In some example embodiments, sensing units have an arrangement of antennas that use directional beams to determine the location and/or direction of travel of a mobile target. The beams are directed in different directions, such that a sensing unit can identify the particular beam that corresponds to (i.e., detects) the mobile target. The sensing unit thus identifies the corresponding beam, and that beam information is coordinated with a wide-angle video camera to filter images from the camera by segmenting out images that correspond to the location and/or direction of the mobile target. The arrangement of antennas can be one that uses individually-directed antenna elements, i.e., antenna elements that produce beams directed along different directions. Each antenna element produces a beam and a beam pattern, where in some examples the beamwidths and beam patterns are the same for each antenna element. In some examples, instead of multiple antenna elements, the sensing units may have one or more phased array of antennas, where each phased array produces a steerable beam pattern, i.e., a beamsteering pattern, which can be narrower in beamwidth than that produced by non-phased array antenna elements.

Advantageously, this coordination may help optimize the overall bandwidth demands of the entire locationing and tracking system, by segmenting the video image into only those images corresponding to the target. And the resulting sequenced timeline of images can be used to meet specific criteria commonly used for general Loss Prevention standards. In many environments, to establish Loss Prevention, particular requirements should be met or shown to establish that an actionable event has occurred. For example, before detaining anyone for shoplifting, generally speaking, one must establish Shoplifting Probable Cause. To establish a solid base for probable cause, there are six universally accepted steps that merchants look to follow before deciding to stop someone suspected of shoplifting: (i) one must see the shoplifter approach the merchandise; (ii) one must see the shoplifter select the merchandise; (iii) one must see the shoplifter conceal or carry away or convert your merchandise; (iv) one must maintain continuous observation the shoplifter; (v) one must see the shoplifter fail to pay for the merchandise; and (vi) one must approach the shoplifter outside of the store.

To provide some example embodiments, video images are segmented using beam information from the sensing units to control the field of view and the video camera and/or the focus of the video camera. The segmentation may be coordinated across different target sensing units, and thus across different video systems, in the venue by using a centralized controller. Such venue-wide coordination may further reduce bandwidth demands on the locationing and tracking system.

Video image segmentation can be triggered by different initiating events identified by sensing units. For example, a sensing unit may detect movement of a target by detecting a change in location of a target RFID, and that detection can be used to initiate coordination and video filtering (segmentation) for generation of a sequenced timeline of images. In some embodiments, the approach of a target to a point-of-sale station or other particular location in a venue may initiate coordination. In some examples, a detectable secondary action associated with the target may be used to initiate coordination. For example, if the target is at a point-of-sale location, such as a cash register, and, as a secondary action, the cash register opens, the combination of both events (the presence of an TOI at a particular location and the secondary action) will initiate coordination and the targeted locationing and tracking herein.

In some examples, the sensing unit is an RFID transmitter that identifies the location of an RFID tag for the target of interest. In some examples, an ultrasound-based locationing system is used as the sensing unit. In some examples, sensing and locationing is determined using a Bluetooth system, Bluetooth Low Energy (BLE) system, WiFi system, beacon-based communication system, or other wireless communication system.

The arrangement for locating and tracking a target in a venue may include a controller having one or more processors and one or more memories. That controller may be a centralized network controller or server, while in other examples that controller can be at one of many target sensing stations that collectively form the arrangement. The arrangement may include a plurality of target sensing stations deployed throughout a venue. Those target sensing stations may, for example, be deployed in overhead positions throughout the venue.

Each target sensing station may include a video system, e.g., a wide-angle video system that is able to capture a wide-angle video stream of at least a portion of the venue. In some examples, a wide-angle video camera is used as the wide-angle video system. As used herein "wide-angle," which includes the subset ultra-wide angle, refers to video cameras or video systems that capture images and/or video over field of view angles that extend from at or about 100° to at or about 180°, or larger angles. As recited herein, references to field of view angles may refer to a horizontal field of view angles, vertical field of view angles, and/or diagonal field of view angles. In any event, each target sensing station may further include a sensing unit that is able to sense a location of a target in the venue. In some examples, these target sensing stations are configured to determine a location and/or direction of a travel of target based on data from the sensing unit. In some examples, the location and/or direction of travel is determined by a centralized controller performing a triangulation, trilateration, multilateration, etc. on data from multiple target sensing stations.

The target sensing stations are configured to coordinate the capture and filtering of video images from the target sensing station based on the location and/or direction of travel of the target. For example, the captured video stream may be filtered to segment out images of the target as the target is moved through the venue. That segmenting may result in discarding video images that do include the target or discarding portions of the wide-angle image that extend beyond an area of interest surrounding and including the target itself. In some examples, the target sensing units control the focusing and field of view of the video system based on the locationing and/or directional information obtained from the sensing unit.

The target sensing stations are communicatively coupled to a controller and send their filtered images to the controller for further processing. The controller may construct a sequenced timeline of images of the target the based on the filtered images from the target sensing stations. The controller may further determine when an alert condition has occurred and transmit the sequenced timeline of images to security personnel or other personnel or any computerized system for managing the alert condition. In some examples, the alert condition is determined at one or more of the target sensing stations and communicated to the controller for further communication of the alert condition over a network. In yet other examples, the target sensing stations may be configured to communicate the alert condition directly to a security system.

Figure 1:
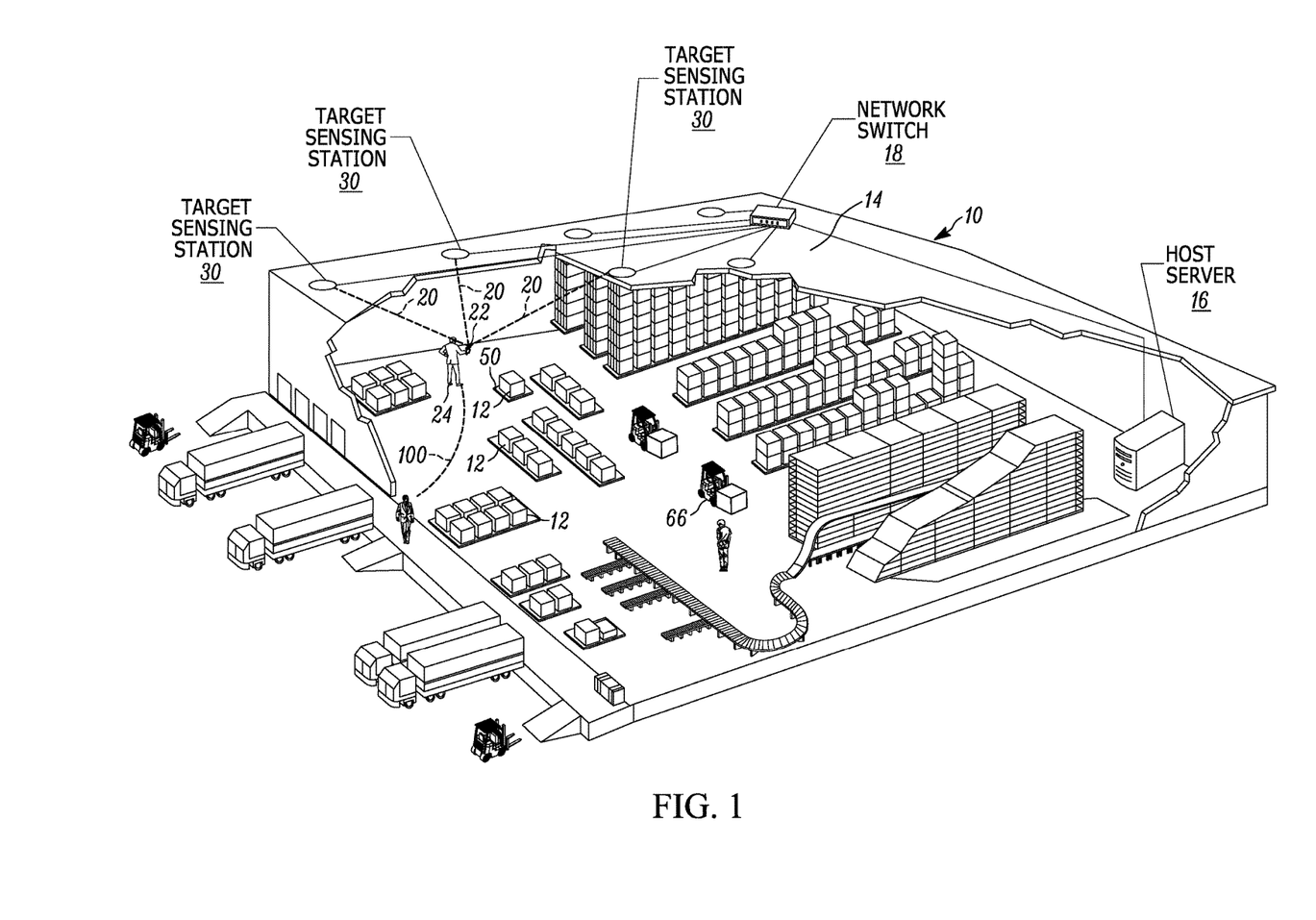
FIG. 1 is a broken-away, perspective view, as seen from above, of an arrangement for locating and tracking a mobile target in a venue in which overhead target sensing stations are deployed, in accordance with an example.

Referring now to the figures, FIG. 1 depicts an example venue 10 in the form of a warehouse in which movable products 12, shown in FIG. 1 as cuboid cartons for simplicity, may be located and tracked in accordance with the techniques described herein. The venue 10 may be any indoor or outdoor venue, and may have any layout or configuration. In some examples, each mobile product 12 is tagged with a mobile target, such as a radio frequency (RF) identification (RFID) product tag, such as a passive or active RFID tag. The RFID product tag may be associated with a single product, which may represent one warehoused item or multiple warehoused items. In some examples, the RFID product tag is associated with a pallet 50, or a container, for supporting multiple products 12.

As also shown in FIG. 1, a multitude of target sensing units or stations 30 are deployed in the venue 10. Each station 30 may be stationarily and fixedly mounted at known overhead positions, for example, on, or adjacent to, a ceiling 14. Merely by way of example, the target sensing stations 30 can be installed every twenty to eighty feet or so apart in a grid pattern. The numbers of target sensing stations 30 may depend on the size of the venue, e.g., thirty, sixty, ninety, or more stations in a venue.

A network computer or host server (controller) 16, typically locally located in a backroom at the venue 10, comprises one or more computers and is in wired, wireless, direct, or networked communication with each target sensing station 30, for example, through a network switch 18. The controller 16 may also be remotely hosted in a cloud server. The controller 16 may include a wireless RF transceiver that communicates with each station 30. For example, Wireless Fidelity (Wi-Fi) and Bluetooth® are open wireless standards for exchanging data between electronic devices.

The server or controller 16 controls each station 30. Albeit, in other examples, any of functions of the controller 16 described herein may be implemented at any one or more of the stations 30.

The computer systems and stations described herein may be connected via a communication network, which can include local and wide-area wireless networks, wired networks, or other IEEE 802.11 or Wi-Fi™ wireless communication systems, including virtual and extended virtual networks. It is envisioned that the communication network includes a controller and various target sensing stations that provide the operations described herein. It should be recognized that the present techniques could also be applied to any suitable wireless communication system. For example, the description that follows can apply to one or more communication networks that are IEEE 802.xx-based, employing wireless technologies such as IEEE's 802.11, 802.16, or 802.20, modified to implement embodiments of the present invention. The protocols and messaging needed to establish such networks are known in the art and will not be presented here for the sake of brevity.

Figure 2:
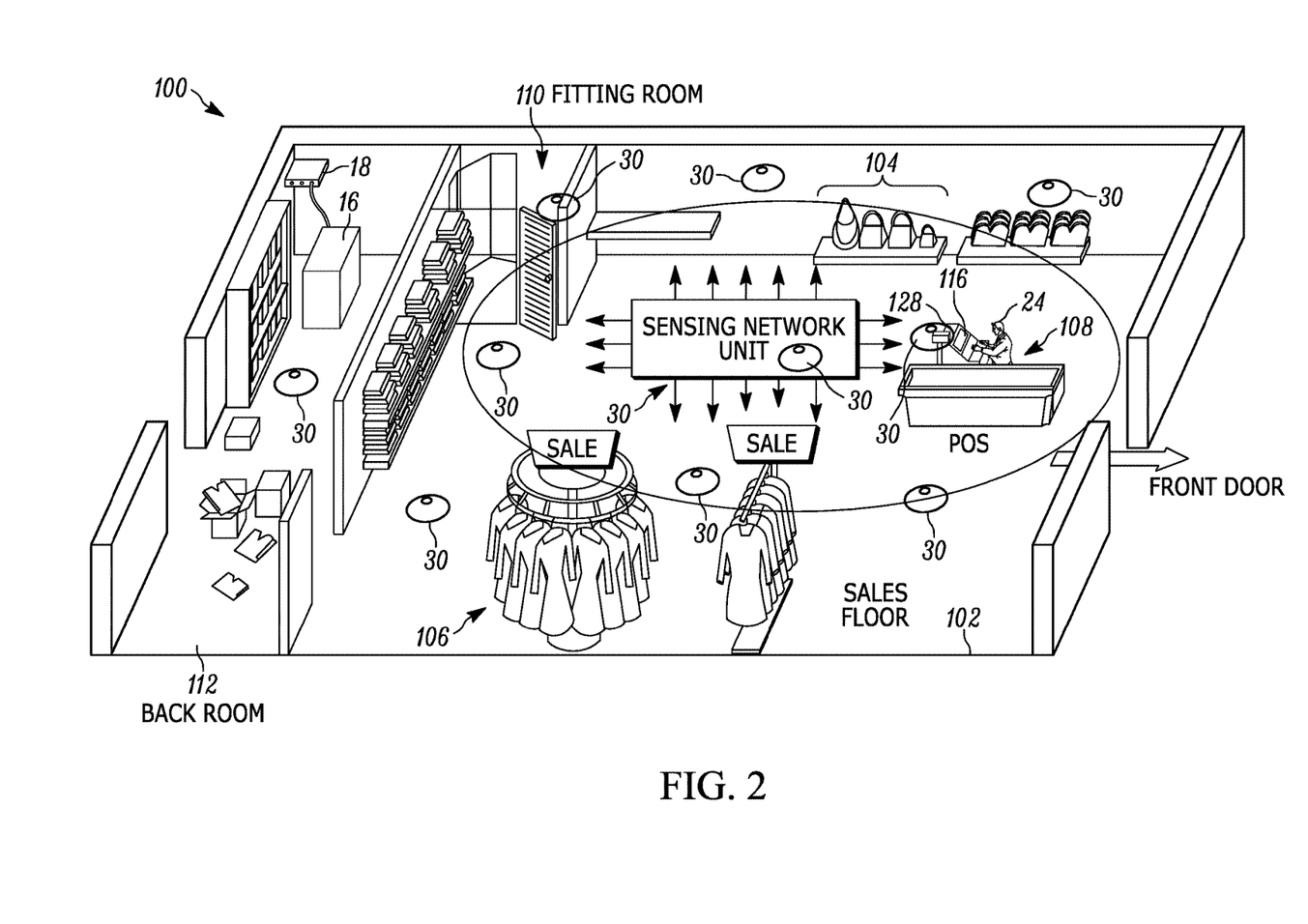
FIG. 2 is a perspective view, as seen from above, of a retail venue in which an arrangement for locating and tracking a mobile target in a venue in which overhead target sensing stations are deployed, in accordance with an example.

FIG. 2 illustrates another example venue 100 in the form of a retail location having a retail sales floor 102 on which a point-of-sale (POS) station 108 is provided having a computer system 116 and an interface 128 having, for example, an optical scanner, touchpad, keypad, display, and data input/output interface connecting to the computer system 116. The computer system 116 is operated by an employee 24. The venue 100 further includes the network host computer or controller 16 connected to the plurality of target sensing stations 30 positioned throughout the venue 100, e.g., via the network switch 18. As further described herein, the target sensing stations 30 are able to locate and track targets including, for example, people, such as the employee 24, who are under video surveillance, as well as the various retail products being offered for sale on the floor 102, e.g., clothes 106, handbags 104, etc., that are arranged on shelves, hangers, racks, etc. Each such product may be tagged with a radio frequency (RF) identification (RFID) tag for location and tracking as described.

The computer 116 may comprise one or more computers and is in wired, wireless, direct, or networked communication with the interface 128 and with each target sensing station 30, e.g., via the network switch 18. The interface 128 provides a human/machine interface, e.g., a graphical user interface (GUI), that presents information in pictorial and/or textual form (e.g., representations of bearings of the RFID-tagged products 104, 106) to the employee 24, and to initiate and/or alter the execution of various processes that may be performed by the computer 116. The computer 116 and the interface 128 may be separate hardware devices and include, for example, a computer, a monitor, a keyboard, a mouse, a printer, and various other hardware peripherals, or may be integrated into a single hardware device, such as a mobile smartphone, or a portable tablet, or a laptop computer. Furthermore, the interface 128 may be in a smartphone, or tablet, etc., while the computer 116 may be a local computer, or a remotely hosted in a cloud computer. The computer 116 may include a wireless RF transceiver that communicates with each target sensing station 30. For example, Wi-Fi and Bluetooth are open wireless standards for exchanging data between electronic devices.

Figure 3:
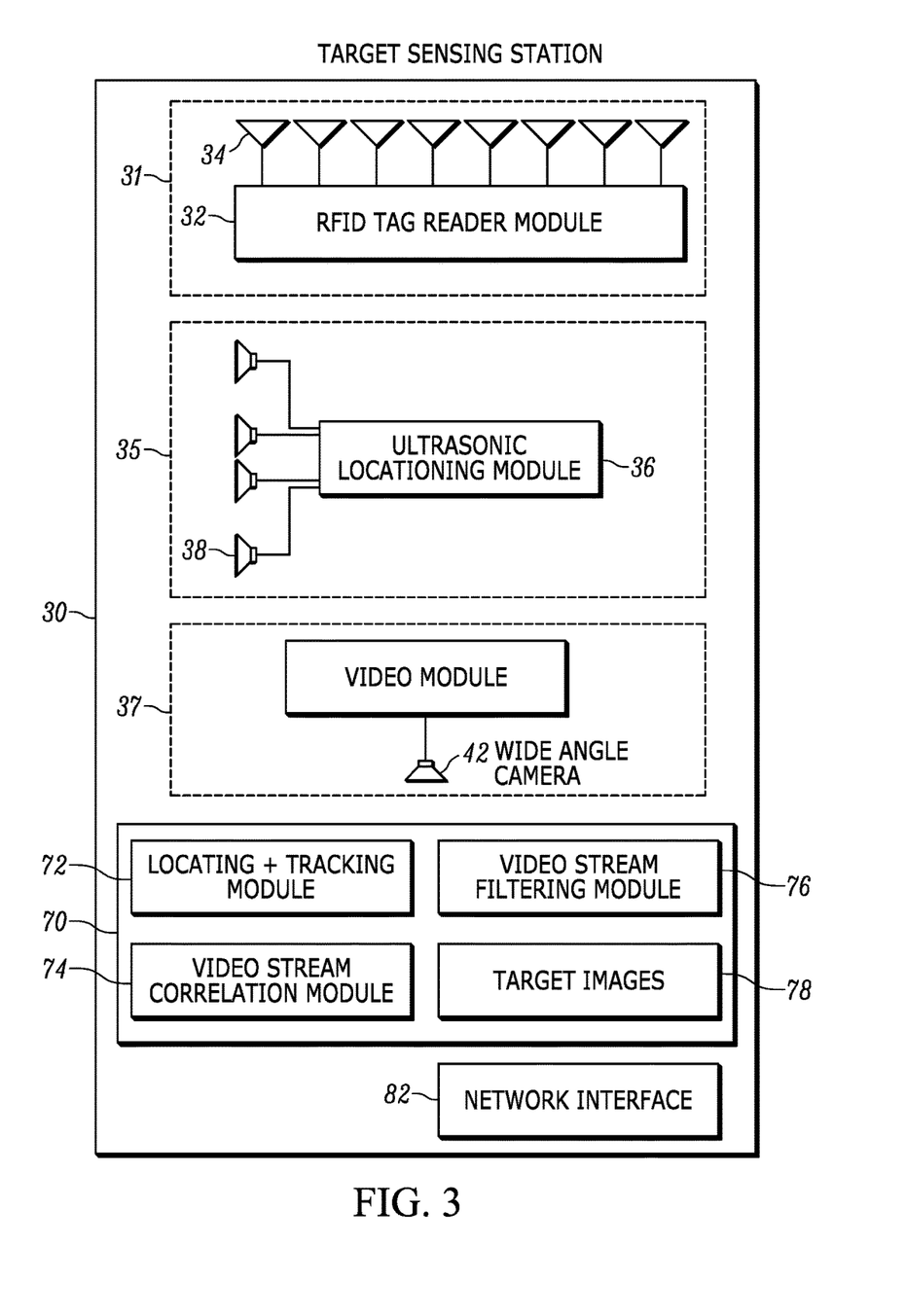
FIG. 3 is a block diagram of an example target stations, as may be used in the venues of FIGS. 1 and 2, in accordance with an example.
Figure 4:
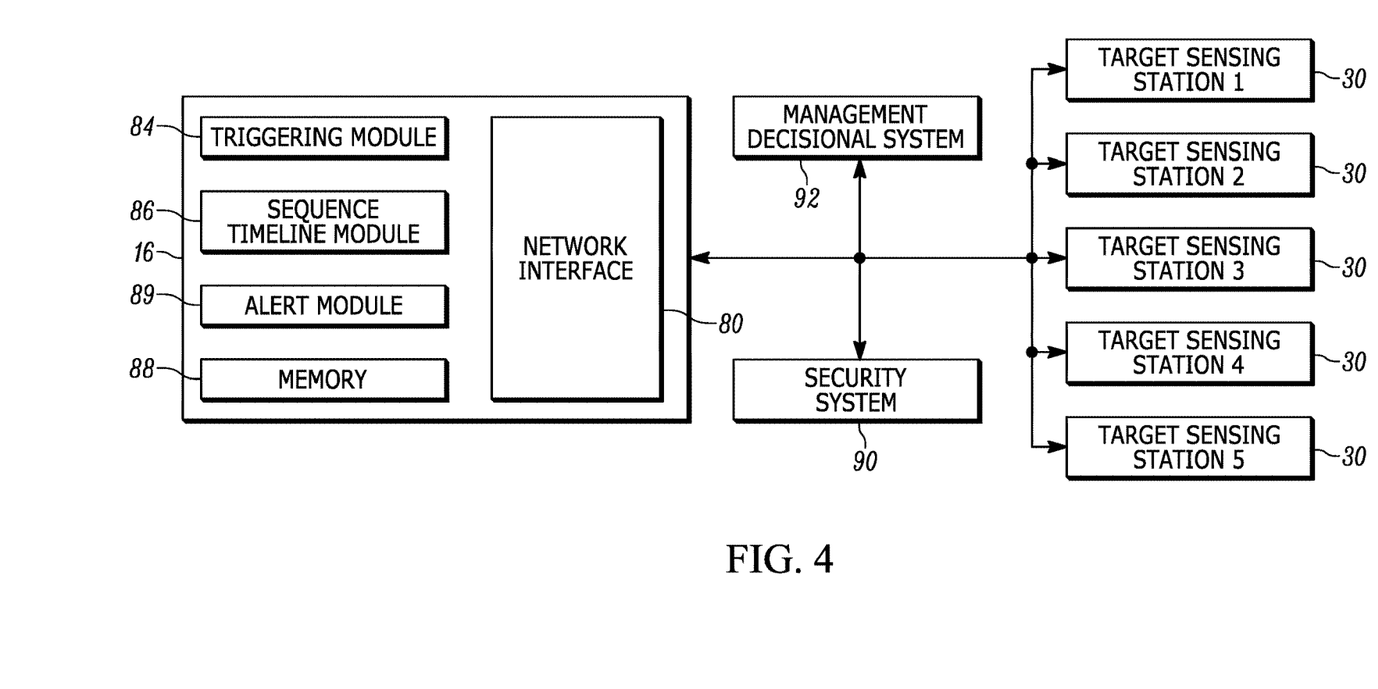
FIG. 4 is a block diagram of an arrangement, for locating and tracking a mobile target, showing a centralized controller and target sensing stations from FIG. 3, in accordance with an example.
Figure 5A:
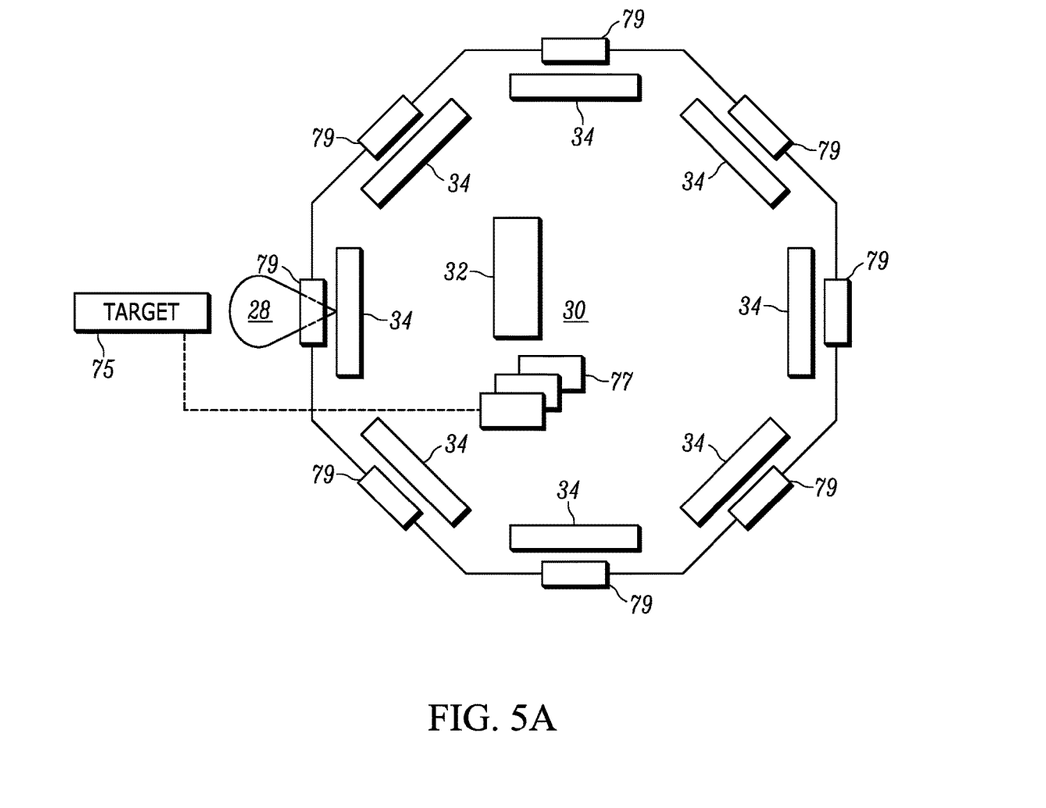
FIGS. 5A and 5B are plan views of an example target sensing station under different location and tracking conditions, in accordance with an example.
Figure 5B:
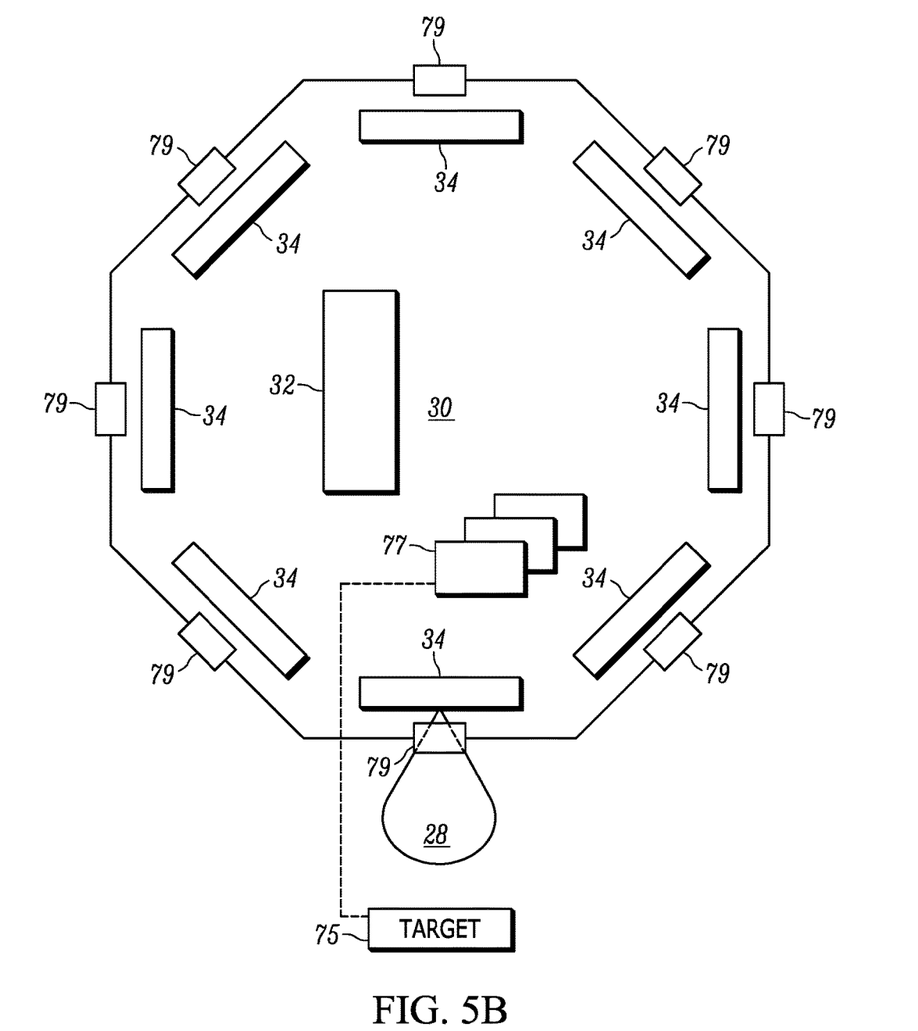

FIG. 3 depicts an example implementation of the target sensing station 30. In the illustrated example, the station 30 includes, for example, a sensing unit in the form of a radio frequency (RF) identification (RFID) tag reader 31 operative for reading a mobile target configured as an RFID tag as it moves within the venue 10. More particularly, as shown in FIG. 3, each overhead RFID reader 31 includes an RFID tag reader module 32 that has a controller, a memory, and an RF transceiver, which are operatively connected to a plurality of RFID antenna elements 34, which are energized by the RFID module 32 to radiate RF energy (also referred to herein as a beam) 28 (see FIGS. 5A, 5B) over an antenna beam pattern. As those of skill will recognize, an antenna and its beam pattern can be characterized by the antenna's beamwidth (i.e., the antenna's half power beamwidth). The RF reader 31 is operated, under the control of the tag reader module 32, to transmit RF beams 28 to the tags, and to receive RF response signals from the tags, thereby interrogating and processing the payloads of the tags that are in a reading zone of the RF transceiver. The RFID reading zone for a target sensing station may be a 360° zone defined by the RFID antenna elements 34 and their collective beam patterns. In the illustrated of FIGS. 5A, 5B, a target sensing station has 8 RFID antenna elements 34, each maintained in a fixed position and each having a beam pattern extending in a different direction. During operation, the RF transceiver captures payload data or target data that identifies the tags and their associated products 12. As shown in FIG. 4, the centralized controller 16 controls the overhead RFID readers in the plurality of target sensing stations 30, also identified by the numerals 1-5, to read the tags on the products 12 in a reading mode of operation in accordance with a set of reading parameters.

As further shown in FIG. 1, a person 24 may hold, carry, and operate any mobile device such as, a mobile phone, or as illustrated by way of non-limiting example, a handheld, portable, mobile RFID tag reader 22 during his/her movement within the venue 10. As described below, the person 24 himself/herself and/or the tag reader 22, may each be considered, either individually or jointly, as a mobile target to be located and tracked in the venue. The mobile reader 22 has a controller, a memory, and an RF transceiver operatively connected to an RFID antenna, which are together operative for reading the product tags associated with the products 12 in the venue 10. The person 24 may be any individual, employee, operator, or associate authorized to operate the handheld, mobile reader 22. To initiate reading, the person 24 manually actuates an actuator or trigger 26 on the mobile reader 22. More than one mobile reader 22 may be present and movable in the venue 10.

Each target sensing station 30 may include another sensing unit, as shown in FIG. 3, in the form of an ultrasonic locationing system 35 operative for locating, for example, a phone, a mobile device, or by way of non-limiting example, the mobile reader 22, by transmitting an ultrasonic signal to an ultrasonic receiver, e.g., a microphone, on the mobile reader 22 or phone. More particularly, the locationing system 35 includes an ultrasonic locationing module 36 having control and processing electronics operatively connected to a plurality of ultrasonic transmitters, such as voice coil or piezoelectric speakers 38, for transmitting ultrasonic energy to the microphone on the mobile reader 22. The receipt of the ultrasonic energy at the microphone locates the mobile reader 22. Each ultrasonic speaker 38 periodically transmits ultrasonic ranging signals, preferably in short bursts or ultrasonic pulses, which are received by the microphone on the mobile reader 22. The microphone determines when the ultrasonic ranging signals are received. The locationing module 36, under the control of the controller 16, directs all the speakers 38 to emit the ultrasonic ranging signals such that the microphone on the mobile reader 22 will receive minimized overlapping ranging signals from the different speakers 38. The flight time difference between the transmit time that each ranging signal is transmitted and the receive time that each ranging signal is received, together with the known speed of each ranging signal, as well as the known and fixed locations and positions of the speakers 38 on each sensing station 30, are all used to determine the location (i.e., position) and/or direction of travel of the microphone and of the mobile reader 22, using a suitable locationing technique, such as triangulation, trilateration, multilateration, etc., as diagrammatically shown by dashed lines 20 in FIG. 1. While such locationing and direction of travel is determined by analysing data from multiple sensing stations at a centralized controller, in other examples any sensing unit (e.g., units 31 and/or 35) at a station may be used to individually determine location and/or direction of travel, or any combination of the sensing units at a station may be used together to determine location and/or direction of travel. For example, one sensing unit can be configured to determine location, while another sensing unit is configured to determine direction of travel.

In the illustrated example of FIG. 3, the target sensing station 30 further includes a video system 37 operative for locating a mobile target by capturing an image of the target in the venue 10. More particularly, the video system 37 is mounted in each sensing station 30 and includes a video module 40 having camera control and processing electronics that is connected to a wide-angle field of view camera 42 for capturing the image of a target. The camera 42 is advantageously a high-bandwidth, video camera, such as a moving picture expert group (MPEG) compression camera. As a wide-angle camera, the camera 42 is able to capture images over a large area to produce a video stream of the images.

As described, the target sensing station 30 collects locationing and direction of travel information from its one or more sensing units, such as the RFID reader 31 and/or the ultrasonic unit 35. That information is correlated with the video system 37 to capture and filter video images based on the location and/or direction of travel of the target. In particular, the target sensing system 30 may filter captured video to segment out from the captured wide-angle video, images of the target near the target sensing station, as the target is moved through the venue. That segmenting may result in discarding video images that do include the target or discarding portions of the wide-angle video that extend beyond an area of interest surrounding and including the target itself.

In the illustrated example, the target sensing station 30 includes a controller 70 that includes a location and tracking module 72 communicatively coupled to the RFID and/or the Ultrasonic sensing units 31 and 35, and configured to determine the location and/or direction of travel of a target relative to the sensing station 30. In the target sensing station 30 of FIG. 5A, for example, each of the antennas 34 is pointing in a different direction on the station 30 and each antenna produces a beam 28 corresponding to that antenna direction. From sensed data from the RFID tag reader module 32, the module 72 determines which antenna 34 has detected the target and thereby determines which beam 28 is in the direction of the target. In the condition of FIG. 5A, one or more target directed images 77 are captured (for example, by filtering from a video stream) over a field of view that corresponds to the beamwidth of the antenna 34 that has detected target 75 (e.g., detecting a transmitter located on or within the target 75). FIG. 5B shows the target sensing station 30 when the target has moved and is detected by another antenna resulting in a set of target directed images 77 being captured over another field of view.

The field of view is determined by the sensing station 30 and represents a portion of the wide-angle image captured by the camera 42. In an example implementation of FIGS. 5A, 5B, and 5C, the first field of view of the sensing station may be 180°. With the mobile target 75 identified by one of the RFID antenna 34, and specifically from the beam 28 as shown, the beamwidth of the antenna 34 may be used as a second field of view, which is narrower than the first field of view of the overall camera. That narrower, second field of view (taken from beamwidth information) is used by the sensing station to capture an image over only a portion of the wide angle image. Specifically, the narrower field of view may have the same angle as that of the beamwidth of the antenna 34. In this way, the second field of view (i.e., corresponding to the captured image of the mobile target 75) will be less than the overall field of view captured by the camera 42.

Figure 5C:
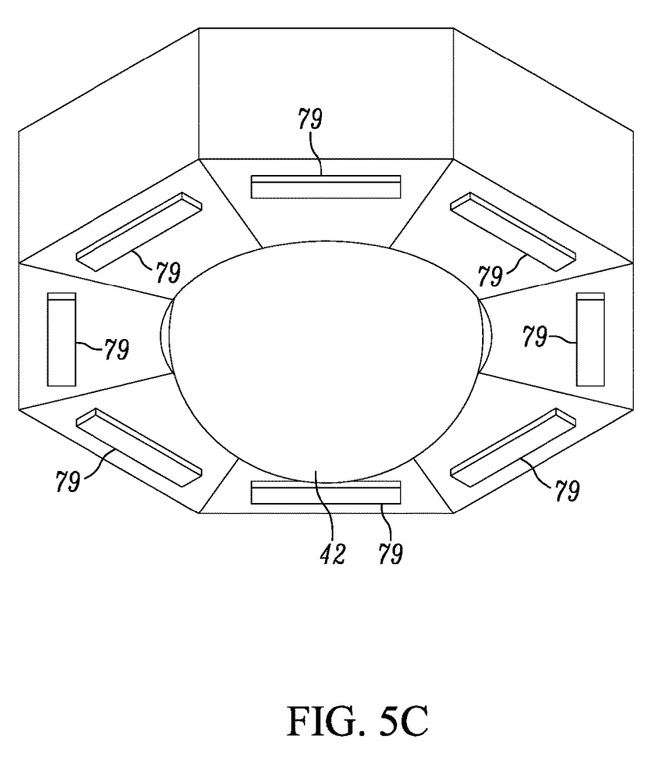
FIG. 5C is a perspective view of the exterior of the target sensing station of FIGS. 5A and 5B showing a wide-angle lens, in accordance with an example.

In the illustrated example of FIGS. 5A and 5B, the target sensing stations 30 further include light emitting diodes (LED) location indicators 79. The LEDs 79 are positioned on the exterior of the station 30 and are externally visible within the venue. The LEDs 79 may be thought of as an LED beacon, in the illustrated example. The LEDs 79 are controlled by one or more of the sensing units 31 and 35 (e.g., by the RFID tag reader module 32 in the illustration) to give a lighted indication of which beam corresponds to the direction of the target in the venue. That is, each antenna 34 has a corresponding LED 79 that will illuminate when the antenna's beam identifies the target. Personnel in the venue can see the illuminated LED and know in which direction a target is located/positioned/moving. Further, in some example embodiments, LEDs 79 can be positioned such that they are visible within the wide-angle video stream of the camera providing further video information on the target within the filtered target images. FIG. 5C is an exterior view of an example of the target sensing station of FIGS. 5A and 5B showing the wide-angle 42 extending downward from a bottom surface of a housing and showing LEDs 79 visible on the exterior of the housing.

In an embodiment, any one of LEDs 79 may be a part of an LED tag which may be activated by the RF energy radiated by a respective antenna. Such LED tags may combine an LED with an induction coil which can be inductively charged to provide energy to the LED. As such, upon the activation of an antenna and its radiation of RF energy, a corresponding LED tag, by way of its coil, will be energized and the LED will be illuminated.

A video stream correlation module 74 is configured to receive the determined beam 28 corresponding to the target and correlate that information to the video stream data collected by the wide-angle camera 42, by determining a field of view of the wide-angle camera that corresponds to the beamwidth of the identified antenna 34. That is, as discussed above, in some examples, the field of view of the filtered video/images matches the angle of the beamwidth.

The target sensing station 30 further includes a wide-angle video stream filtering module 76 that receives the determined field of view information from the module 72 and receives the wide-angle video stream from the wide-angle camera 42. The module 76 filters the received video stream by identifying a portion of the wide-angle video stream that corresponds to the determined field of view, which, generally speaking, will be smaller than the wide-angle field of view. For example, using a 180° field of view video camera, the determined field of view will be a portion of the captured 180° field of view video. More particularly, in some examples, the module 76 segments the received video stream, along the direction of the determined field of view, and captures an image from the video stream corresponding to only that determined field of view. The result may be one or more images of the target that are captured and stored on the target sensing station as target directed images in a database or memory 78.

The module 76 may be configured to perform a number of different types of image processing filtering on the received video stream. In addition to segmenting the video stream into a desired field of view for target image capture, the module 76 may perform a zoom-in procedure on the video stream corresponding to the determined field of view, to capture a magnified image of the target, i.e., magnified from whatever magnification factor is present in the received video stream. The amount of the magnification factor may be determined by the module 76 and based on a determined location of the target, such as the determined distance of the target from the sensing unit. For example, the module 76 may access a table of magnification values for different target distances. In some examples, the module 76 determines the magnification factor based on the type of target detected by the sensing unit. For example, if the identified target is an employee wearing an RFID tag (and therefore associated with the RFID number stored in the system), the module 76 may be configured to apply a different magnification factor than if the target is a small inventory in a retail space. The module 76 may combine multiple data values to determine the amount of magnification, including the location and distance, the type of target, and other data.

The filter module 76 may apply other image processing filtering procedures. These include a zoom out procedure achieved in a similar manner to that of the zoom in procedure, a focusing procedure, an image tilting procedure, an image panning procedure, etc. The focusing, image tilting, and image panning procedures may be performed based on location data, such as position and distance, as well directional of travel data, all obtained from the sensing units.

In some examples, the focusing, image tilting, and image panning procedures are determined by first performing image processing on the target in the wide-angle video stream. For example, in some embodiments, the filtering module 76 may perform target identification procedures over the determined field of view, procedures such as edge detection to identify the target, segmentation to segment out the target's image from other objects in the video stream, and a determination of any translational, rotational, shearing, or other image artefacts affecting the target image and that would then be corrected for before storing the captured target image.

FIG. 4 illustrates an example arrangement for locationing and tracking of mobile targets, showing the central controller 16 coupled to a plurality target sensing stations 30 each positioned throughout the venue. In the illustrated example, the central controller 16 includes a network communication interface 80 communicatively coupled to network communication interfaces 82 of the stations 30 to receive sensing unit data, such as RFID information and/or ultrasonic locationing information, and video stream data, such as a video stream from the wide-angle camera 42. One of the benefits of the present techniques is that bandwidth demands on the arrangement of FIG. 4 may be greatly reduced because the entire video stream need not be sent to the controller 16. Instead, only the target directed images filtered from the respective video streams of the stations 30 are transmitted to the controller 16, thereby substantially reducing the data transmission bandwidth requirements of an arrangement.

The controller 16 further includes a triggering module 84 that receives data from the stations 30 and is configured to determine if a triggering event has occurred. That is, in some example embodiments, the locationing and tracking of a mobile target and the segmentation of the resulting video stream is performed in response to a triggering event that has occurred within the venue. Before the triggering event, for example, the target sensing stations 30 may merely identify a target and location of the target, such as a target positioned on a shelf in a warehouse facility or retail space. Upon detection of a triggering event, in some examples, the module 84 sends instructions to one or more of the target sensing stations to enter into an image capture mode where the processes of FIG. 6 may be performed and target directed images may be captured by the stations 30 and sent to the controller 16. In some examples, the triggering event is the detection of movement of a target, which can be determined by the module 84 from a change in target location data as sensed by one or more target sensing stations. That change in target location may be determined at the module 84 in some examples, while in other examples the target sensing stations determine that a target has changed location, and that data is communicated to the triggering module 84 for sending instructions to stations 30 to enter into a target image capture mode. That is, in some examples, the presence of a triggering may be determined at the central controller 16, and in other examples, triggering modules are included at the stations 30, such that one or more of the stations 30 may determine the presence of a triggering event. While the use of a triggering module to initiate target image capture may be beneficial to further reduce bandwidth demands by preventing the central controller 16 from receiving video stream data, whether un-filtered or filtered as described, until a target has started moving within a venue, the use of a triggering module may be optional. In some examples, the stations 30 may be configured to continually locate and track certain targets and to continually filter video streams to generate target directed images.

In the illustrated example, the triggering module 84 further operates to instruct a sequence timeline module 86 to begin receiving target directed images from one or more sensing stations and to construct a sequenced timeline of images (see FIG. 7) of the target as the target moves through the venue 10. The module 86 receives the captured images from the different sensing stations 30 and sequences them to create the timeline, which may be considered as a breadcrumb-type trail of the target as it moves through the venue 10. The controller 16 may continuously assemble the sequence timeline of images in response to the first triggering event determined by the module 84. The sequence timeline of images may be stored in one or more memories 88 of the controller 16. In addition to storing the images, the memory 88 is a computer readable medium that may additional store executable instructions to implement any of the processes described herein, including those of the modules 80, 84, and 86.

In operation, the controller 16 may coordinate operation across the target sensing stations 30 by sending each station 30, in response to the first triggering event, an instruction to enter a target image capture mode. In this mode, each station continually senses for the presence of a target. The particular target of interest may be identified to the stations 30 by the controller 16 based on the information determined at the triggering module 84. For example, if the triggering module 84 determines, or receives information indicating, that a particular target, identified by its RFID tag, has started to move with a venue and needs to be tracked with capture images, the module 84 may send the RFID tag information for that target to each of the stations 30 in the venue. When any particular station 30 detects the presence of that identified target, the station 30 will then proceed to perform the processes herein and capture target directed images, which are then sent to the controller 16 for sequenced timeline generation.

In some embodiments, in addition to determining the presence of the first triggering event, the triggering module 84 determines the presence of a second triggering, which may be used to instruct the sequence timeline module 86 to stop assembling the sequence timeline of images. The second triggering event may be a non-alert type event, such as an event that indicates the target has stopped moving with the venue, has been placed at a previously-determined acceptable location with the venue, or some other condition. In some examples, the triggering module 84, determining the second triggering event from the received data from the stations 30, may instruct the module 86 to stop assembling the sequenced timeline of images. In yet other examples, the second triggering event may be an alert event, such as an event indicating a possible theft of a target or movement of the target to an authorized location in the venue. This second triggering event may be determined based on the location of the target in the venue. For example, if the location and tracking information from the stations 30 indicates to the triggering module 84 that the target is within a predetermined proximity to an exit of a venue, within a restricted area, within a predetermined proximity to a point of sale machine or location, or other alert condition, then the module 84 may instruct the sequence timeline control module 86 to adjust sequencing to concentrate on the target, e.g., by collecting and sequencing images at a higher rate or by instructing that a capturing sensing station zoom in on the target.

Further the triggering module 84 may instruct an alert module 89 to generate an alert signal that may be communicated to a security system 90 communicatively coupled to the controller 16 through the network interface 80. The alert signal may be an instruction to the security system 90 to display an alert condition to personnel monitoring the security system to take action.

The alert module 89 may separately communicate the alert signal to a retail/warehouse management decisional system 92 for alerting management personnel of the second triggering event. The decisional system 92 may be partially or fully automated computerized system that receives the alert signal and automatically performs any of a variety of functions, including, displaying an alert to management personnel, and sending information of the target to an inventory system.

As described herein, in some examples, the sensing stations 30 determine the location, direction of travel, and speed of movement of a mobile target. In other examples, the controller 16 determines these parameters from received sensed data. The sensing stations 30 may be maintained in constant operation, continuously capturing wide-angle video streams. The controller 16 may be configured to determine whether the captured video streams are to be continuously sent to the controller 16 or not. The controller 16, for example, may instruct the sensing stations to only periodically send captured video streams to the controller 16. Or the controller 16 may instruct the sensing stations to not send captured video streams altogether.

Figure 6:
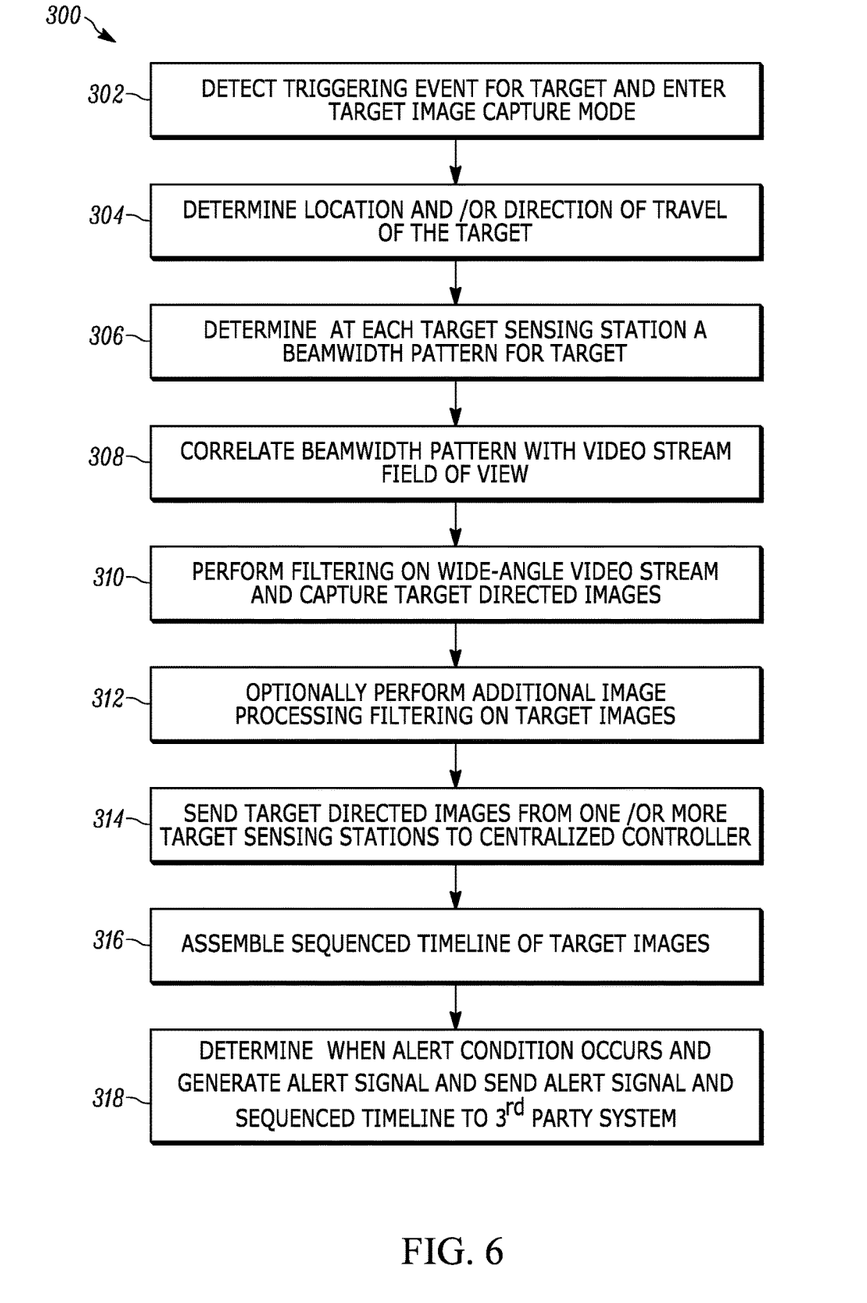
FIG. 6 is a flow chart of a process of locating and tracking a mobile target, in accordance with an example.

FIG. 6 illustrates a flowchart representative of an example process 300 performed by the controller 16 and the one or more target sensing stations 30 to achieve optimized locationing of a mobile target and to generate a sequenced timeline of images of the target moving through a venue. At either a central controller or a target sensing station, a triggering event is detected for a target and the stations in the venue are instructed to enter into a target image capture mode (block 302). In the target image capture mode, each sensing station detects for the target. The sensing stations may, in some examples, determine a location and/or direction of travel of the target (block 304) when detected, so that this information can be sent to the centralized controller for coordinating operation of other sensing stations in the venue. In some examples, location and/or direction of control may be determined only at the centralized controller, in which case, once a target capture mode has been entered, each sensing station may then just capture the wide-angle video stream of the target when the target is detected and then produced captured images from that video stream.

With the target detected by the sensing unit(s), the sensing unit(s) in the target sensing station will then determine a beam pattern corresponding to the target (block 306). A video stream correlation module of the station then correlates the beam, to identify a field of view of a wide-angle video stream that includes that portion of the beam (block 308). A filtering module then performs target image field of view filtering on the wide-angle video stream and captures a target directed image (block 310). Optionally, additional image processing filtering may be performed, such as zooming in/out, focusing, tilting, and/or panning (block 312). The resulting target directed images from the sensing station are sent to a centralized controller (block 314), which receives the target directed images from any of the sensing stations capturing images of the target. The centralized controller assembles sequence timeline of the images (block 316), and determines if an alert triggering condition has been met in which case the controller generates an alert condition (318).

Figure 7:
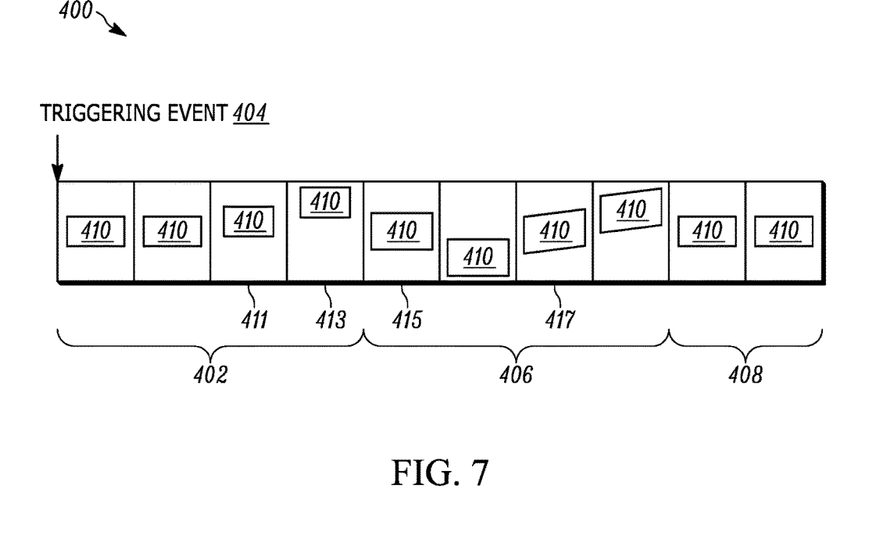
FIG. 7 illustrates a sequenced timeline of captured images of a target as may be generated by the process of FIG. 6, in accordance with an example.

FIG. 7 illustrates an example sequence timeline of images 400 assembled by the controller. A first segment 402 of the timeline 400 represents images captured from a first target sensing station, in particular the station that originally detected the triggering event 404. The controller has assembled the timeline to include target directed images of the target from two other sensing stations 406 and 408. As shown in the illustrated example, a target 410 is shown in each of the capture images, and at different locations within a frame, as occurs from target movement (see, e.g., frames 411 and 413), at different magnification levels (see, e.g., frames 411 and 415), and at different orientations (see, e.g., frames 411 and 417).

The above description refers to block diagrams of the accompanying drawings. Alternative implementations of the examples represented by the block diagrams include one or more additional or alternative elements, processes and/or devices. Additionally or alternatively, one or more of the example blocks of the diagrams may be combined, divided, re-arranged or omitted. Components represented by the blocks of the diagrams are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations represented by the flowcharts of this disclosure). Some example logic circuits are hardware that executes machine-readable instructions to perform operations (e.g., one or more of the operations represented by the flowcharts of this disclosure). Some example logic circuits include a combination of specifically configured hardware and hardware that executes machine-readable instructions.

The above description refers to flowcharts of the accompanying drawings. The flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations represented by the flowcharts are implemented by machine-readable instructions (e.g., software and/or firmware) stored on a medium (e.g., a tangible machine-readable medium) for execution by one or more logic circuits (e.g., processor(s)). In some examples, the operations represented by the flowcharts are implemented by one or more configurations of one or more specifically designed logic circuits (e.g., ASIC(s)). In some examples the operations of the flowcharts are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored. Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

As used herein, each of the terms "tangible machine-readable medium," "non-transitory machine-readable medium" and "machine-readable storage device" is expressly defined as a storage medium on which machine-readable instructions are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

We claim:

1. A target sensing station for locating and tracking a target in a venue, and for communicating with an external host, comprising:
   a controller;
   a video system operatively connected to the controller, the video system including a camera configured to capture a first video stream in a first field of view (FOV); and
   a plurality of sensing units operatively connected to the controller, each of the plurality of sensing units configured to sense a transmitter associated with the target and to provide sensed data associated with the sensed transmitter,
   wherein, based at least in part on the sensed data, the controller is configured to filter the first video stream to output a second video stream that is different from the first video stream,
   wherein the controller is further configured to transmit the second video stream to the external host,
   wherein each of the plurality of sensing units is a radio frequency (RF) identification (RFID) transceiver including an antenna characterized by a beamwidth, and wherein the controller is further configured to filter the first video stream to output the second video stream based at least in part on the respective beamwidth of the antenna of at least one of the RFID transceivers that senses the transmitter associated with the target, and
   wherein the second video stream has a second FOV that is different from the first FOV, and wherein the second FOV correlates with the respective beamwidth of the antenna of the at least one of the RFID transceivers that senses the transmitter associated with the target.

2. The target sensing station of claim 1, wherein the second FOV is narrower than the first FOV.

3. The target sensing station of claim 1, wherein the controller is further configured to filter the first video stream to output the second video stream in response to a first triggering event occurring within the venue.

4. The target sensing station of claim 3, wherein the controller is further configured to transmit the second video stream to the external host in response to the first triggering event occurring within the venue.

5. The target sensing station of claim 3, wherein the controller is further configured to track the target via the second video stream from an initial position to a final position, the initial position being associated with the first triggering event and the final position being associated with a second triggering event.

6. The target sensing station of claim 5, wherein the controller is further configured to generate an alert signal and communicate the alert signal to a security system communicatively coupled to the controller in response to the second triggering event being an alert even.

7. The target sensing station of claim 1, wherein the controller is further configured to filter the first video stream to output the second video stream by performing at least one of a zoom in procedure, a zoom out procedure, a focusing procedure, an image tilting procedure, and an image panning procedure.

8. A system for locating and tracking a target in a venue, comprising:
   a host computer; and
   a plurality of target sensing stations, each of the plurality of target sensing stations including:
      a controller;
      a video system operatively connected to the controller, the video system including a camera configured to capture a first video stream in a first field of view (FOV); and
      a plurality of sensing units operatively connected to the controller, each of the plurality of sensing units configured to sense a transmitter associated with the target and to provide sensed data associated with the sensed transmitter,
      wherein, based at least in part on the sensed data, the controller is configured to filter the first video stream to output a second video stream that is different from the first video stream,
      wherein the controller is further configured to transmit the second video stream to the host computer
      wherein each of the plurality of sensing units is a radio frequency (RF) identification (RFID) transceiver including an antenna characterized by a beamwidth, and wherein the controller is further configured to filter the first video stream to output the second video stream based at least in part on the respective beamwidth of the antenna of at least one of the RFID transceivers that senses the transmitter associated with the target, and
      wherein the second video stream has a second FOV that is different from the first FOV, and wherein the second FOV correlates with the respective beamwidth of the antenna of the at least one of the RFID transceivers that senses the transmitter associated with the target.

9. The system of claim 8, wherein the host computer is configured to sequence the respective second video stream from each of the plurality of target sensing stations to produce a third video stream.

10. The system of claim 9, further comprising a security system, wherein the host computer is configured to transmit the third video stream to the security system.

11. The system of claim 8, wherein the second FOV is narrower than the first FOV.

12. The system of claim 8, wherein the controller is further configured to filter the first video stream to output the second video stream in response to a first triggering event occurring within the venue.

13. The system of claim 12, wherein the controller is further configured to transmit the second video stream to the host computer in response to the first triggering event occurring within the venue.

14. The system of claim 12, wherein the controller is further configured to track the target via the second video stream from an initial position to a final position,
   the initial position being associated with at least one of the first triggering event, a target position tracked by the controller of at least one target sensing station of the plurality of target sensing stations, and the target coming into the first FOV,
   the final position being associated with at least one of a second triggering event, a target position tracked by the controller of at least one target sensing station of the plurality of target sensing stations, and the target leaving the first FOV.

15. The system of claim 14, wherein the host computer is configured to sequence the respective second video stream from each of the plurality of target sensing stations to produce a third video stream, the third video stream tracking the target.

16. A method of locating and tracking a target in a venue, the method comprising the steps of:
   providing a host computer;
   providing a plurality of target sensing stations, each of the plurality of target sensing stations being communicatively coupled to the host computer; and
   for each of the plurality of target sensing stations,
      capturing, by a video system operatively connected to a controller, a first video stream in a first field of view (FOV);
      sensing, by a plurality of sensing units operatively connected to the controller, a transmitter associated with the target and providing sensed data associated with the sensed transmitter;
      filtering, by the controller, the first video stream to output a second video stream that is different from the first video stream, the filtering being based at least in part on the sensed data; and
      transmitting, by the controller, the second video stream to the host computer,
      wherein the sensing includes emitting, by each of the plurality of sensing units having a respective antenna characterized by a beamwidth, radio frequency energy,
      wherein the filtering includes basing the second video stream at least in part on the respective beamwidth of the antenna of at least one of the plurality of sensing units that senses the transmitter associated with the target, and
      wherein the second video stream has a second FOV that is different from the first FOV, and wherein the filtering includes correlating the second FOV with the respective beamwidth of the antenna of the at least one of the plurality of sensing units that senses the transmitter associated with the target.

17. The method of claim 16, further comprising the step of sequencing, by the host computer, the respective second video stream from each of the plurality of target sensing stations to produce a third video stream.

18. The method of claim 17, further comprising the steps of:
   providing a security system; and
   transmitting, by the host computer, the third video stream to the security system.

19. The method of claim 16, wherein the second FOV is narrower than the first FOV.

20. The method of claim 16, wherein the filtering is performed in response to a first triggering event occurring within the venue.

21. The method of claim 20, wherein the transmitting is performed in response to the first triggering event occurring within the venue.

22. The method of claim 20, wherein for each of the plurality of target sensing stations the steps further include:
   tracking, by the controller, the target via the second video stream from an initial position to a final position
      the initial position being associated with at least one of the first triggering event, a target position tracked by the controller of at least one target sensing station of the plurality of target sensing stations, and the target coming into the first FOV,
      the final position being associated with at least one of a second triggering event, a target position tracked by the controller of at least one target sensing station of the plurality of target sensing stations, and the target leaving the first FOV.

23. The method of claim 22, further comprising the step of sequencing, by the host computer, the respective second video stream from each of the plurality of target sensing stations to produce a third video stream, the third video stream tracking the target.

* * * * *